United States Patent [19]
Weman

[11] 3,858,825
[45] Jan. 7, 1975

[54] RETRACTOR FOR A SAFETY BELT ESPECIALLY FOR MOTOR VEHICLES

[75] Inventor: Per Olof Weman, Haslah, Germany
[73] Assignee: Klippan GmbH, Kohfurth, Germany
[22] Filed: Sept. 19, 1973
[21] Appl. No.: 398,729

Related U.S. Application Data
[63] Continuation-in-part of Ser. No. 284,843, Aug. 30, 1972, abandoned.

[52] U.S. Cl........ 242/107.4, 188/317, 242/107 SB
[51] Int. Cl.................................................. A62b 35/02
[58] Field of Search....... 242/107 R, 107.4, 107 SB; 280/150 SB; 297/388, 386; 188/317

[56] References Cited
UNITED STATES PATENTS

| | | | |
|---|---|---|---|
| 3,193,327 | 7/1965 | Roe | 242/107.4 |
| 3,484,134 | 12/1969 | Townsend | 297/386 |
| 3,632,057 | 1/1972 | Pringle | 242/107.4 |
| 3,635,420 | 1/1972 | Romanzi | 242/107.4 |

Primary Examiner—John W. Huckert
Assistant Examiner—Edward J. McCarthy
Attorney, Agent, or Firm—Jonathan Plaut; John P. Kirby, Jr.

[57] ABSTRACT

A retractor for a safety belt having a latching member operatively coupled to a restraint means in the form of a hermetically sealed fluid containing cylinder piston arrangement providing a one-way delaying action in the actuation of the latching mechanism into the blocking condition when the safety belt is withdrawn from the retractor.

11 Claims, 4 Drawing Figures

RETRACTOR FOR A SAFETY BELT ESPECIALLY FOR MOTOR VEHICLES

This application is a continuation-in-part application of Ser. No. 284,843, filed Aug. 30, 1972 abandoned.

BACKGROUND OF THE INVENTION

The present invention relates to a retractor device for a safety belt which is especially suitable for use in motor vehicles. The device includes a spring biased belt roller connected to at least one ratchet wheel. A latching means is adapted to engage the ratchet wheel to block the belt roller against any further withdrawal of belt therefrom.

In some types of heretofore known safety belt retractor devices the belt may be withdrawn from the belt roller as long as a tension force is applied on the belt. When the tension force on the belt is removed the retractor rewinds a very short length of belt whereby the belt roller is blocked automatically and without delay against any further withdrawal of belt from the belt roller. This feature may involve a disadvantage when initially fastening the safety belt, especially when the operator of a motor vehicle tries to fasten the belt himself while driving the vehicle. It may quite frequently happen that the user of the belt withdraws the belt by an insufficient length which does not permit him to snap the buckle mounted on the outer free end of the belt onto the mating buckle member or the like. If under these circumstances the belt roller becomes blocked, some particular manipulations are required in order to enable the driver to withdraw the belt over the necessary length, and these efforts may be disturbing to the driver while driving the vehicle.

It is an object of the present invention to provide a novel and improved retractor device for a safety belt which overcomes the above-stated disadvantages associated with prior art devices of this type.

It is another object of the present invention to provide a retractor device of the above-defined type which allows the user sufficient time to withdraw the belt over the desired length, and this likewise when the tension force exerted on the belt is not continuously applied, and furthermore ensures blocking of the belt roller as soon as the belt has been withdrawn by the required amount.

SUMMARY OF THE INVENTION

For achieving the above objects, the present invention proposes a retractor device for a safety belt which includes latching means operationally coupled to a restraint means which in turn retards a movement of the latching means into a blocking position when withdrawing the safety belt from the belt roller.

The restraint means may have any of various forms. In any case, an essential requirement is that the movement of the latching means into the blocking position is retarded, preferably with a delay of about 5 to about 20 seconds, whereas the movement thereof in the blocking position should not be retarded in order to allow complete winding of the belt through the belt retractor when the belt is unfastened or no longer required. As for the rest, the retractor device is of an extremely simple design so that the operation reliability of the belt retractor may not be impaired by a multitude of components. Furthermore, it is advantageous to design the restraint means in such a manner that contaminations such as dirt or the like do not constitute a safety risk in operation.

In accordance with another feature of the present invention the restraint means includes a piston disposed within a cylinder whereby the position of the piston within the cylinder determines the position of the latching means relative to a ratchet wheel of the belt roller. Preferably, the piston and the latching means are operationally coupled by means of a magnetic flux coupling. In the latter case, the piston itself may be formed of a permanent magnet and the latching member may be made of a magnetic metal whereas the cylinder is made of a non-magnetic metal so that the latching member follows the positional displacements of the piston within the cylinder without any mechanical connection being provided between these members, i.e., between the piston and the latching member which mechanical connection might otherwise interfere with the proper and failproof operation. The piston may be disposed within a cylinder sealed on all sides, and this cylinder is preferably entirely filled with a suitable fluid such as alcohol or oil or the like serving to attenuate the piston movement within the cylinder. When with such an arrangement the cylinder is mounted in an upright position in the belt retractor and above the belt roller and the latching means is disposed between the cylinder and the belt roller, additional means may be provided to delay downward movements of the piston within the cylinder to block the belt roller by means of the latching member. On the other hand, the piston is free to move upwardly without any delay, in entraining the latching means. Toward this end, the piston is preferably provided with apertures through which may pass the fluid contained in the cylinder, and with a sealing means for obstructing the apertures in a lost-motion arrangement whereby this sealing means is arranged to obstruct the apertures in the piston when the piston moves in a direction in which the sealing means is entrained by the piston towards the blocking position. When the piston moves downwardly the sealing means may obstruct partially or completely the piston apertures so that the piston moves downwardly within the cylinder at a relatively low speed and the belt roller is not blocked until some time after withdrawal of the belt from the belt roller.

When the user unfastens the safety belt so that the belt should be rewound quickly, the latching means may be lifted relatively quickly, e.g., by means of the belt convolutions on the belt roller, since when the piston moves upwardly within the cylinder the piston apertures are not obstructed by the sealing means so that the fluid contained in the cylinder may pass freely from the upper part of the cylinder through the piston apertures into the lower part of the cylinder.

DESCRIPTION OF THE DRAWINGS

In the following, an illustrative embodiment of the present invention is described with reference to the appended drawing showing schematically a retractor device having a restraint means in accordance with the invention for the latching mechanism, and further essential parts of the retractor.

DETAILED DESCRIPTION

Figure 1:
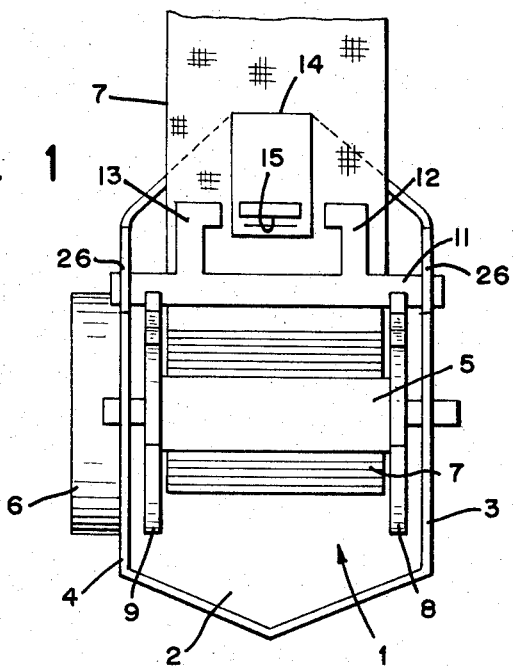
FIG. 1 is a top view of a retractor device in accordance with the invention and incorporating a restraint means for the latching mechanism.
Figure 2:
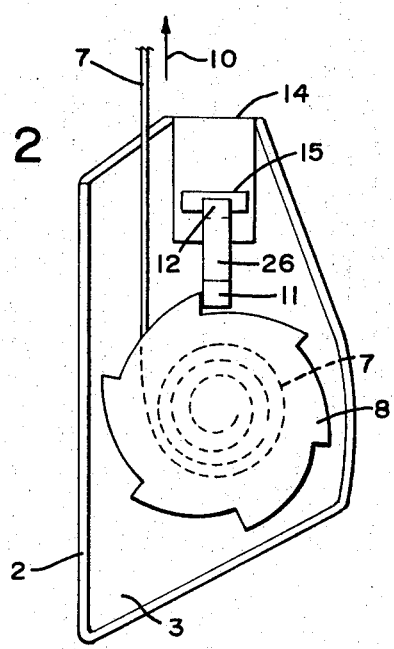
FIG. 2 is a lateral elevational view of the retractor device of FIG. 1.

Referring to FIGS. 1 and 2, the retractor device for a safety belt according to the present invention includes a casing 1 consisting of a bottom plate 2 and a pair of lateral walls 3 and 4. A belt roller 5 is rotatably mounted in the two lateral walls 3 and 4 and biased by a wind up spring 6 which is arranged on an outer surface of the lateral wall 4. The end portion of a belt 7 is wound onto the belt roller 5. Between the two lateral walls 3 and 4 the belt roller 5 mounts at either end and exteriorly of the belt windings 7 a ratchet wheel 8 or 9 respectively. The ratchet wheels 8 and 9 are fixedly secured to the belt roller 5. In the position shown in FIGS. 1 and 2 the belt roller 5 is blocked against further withdrawal of belt in the direction of the arrow 10 by means of a bar-shaped latch 11 engaging both ratchet wheels 8 and 9. This bar-shaped latch 11 is made of a magnetizable metal and includes a pair of projecting portions 12 and 13. These projecting portions 12 and 13 engage or alternatively face the outer surface of a cylinder 14. The cylinder 14 is completely sealed, i.e., sealed on all sides and is made of a non-metallic material. Within the cylinder 14 is disposed a piston 15 made of a permanent magnet. The piston 15 floats in a suitable liquid such as alcohol which entirely fills the remaining interior space of the cylinder 14.

Referring to FIGS. 1 and 2, an elongated rectangular slot 26 is provided in each lateral wall 3 and 4 to act as a channel means to guide the latch 11 into engagement with the ratchet wheels 8 and 9 and prevent rotation of the latch 11 and the ratchet wheels 8 and 9 after engagement. There are two slots 26 provided, one slot 26 for each end of the bar of latch 11. The slots 26 are positioned parallel to the bottom plate 2, as shown in FIG. 2. The latch 11 moves in a longitudinal, up-and-down path established by the slots 26. Referring to FIG. 1, each end of the bar of latch 11 is mounted in, extends through and slides within one of the slots 26. The area defined by slot 26 in FIG. 2 includes the area which is coincident with the area identified by numerals 26 and 12 (projecting portion of latch).

Figure 3:
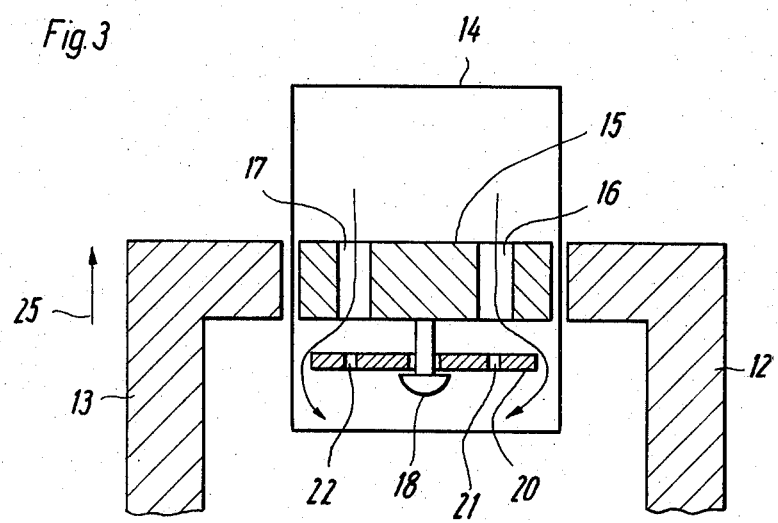
FIG. 3 is an enlarged fragmentary view showing the restraint means in a position when winding up the belt.
Figure 4:
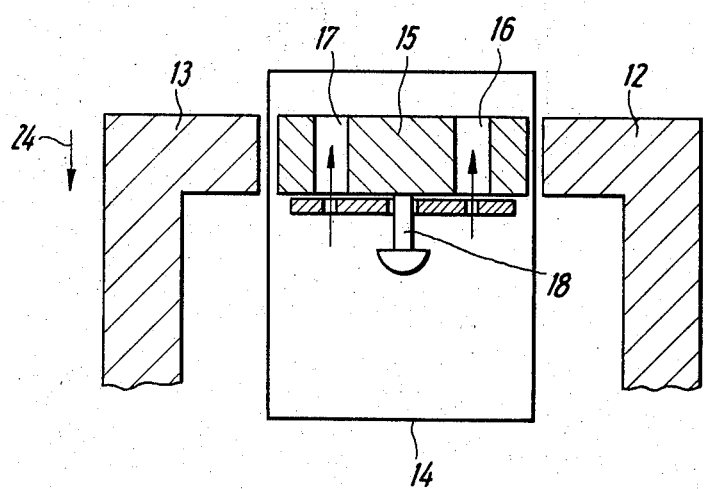
FIG. 4 is a view similar to FIG. 3 but showing the restraint means in a position when withdrawing the belt from the belt roller.

As may be seen in more detail in FIGS. 3 and 4, the piston 15 is provided with apertures 16 and 17. At the lower surface of the piston 15 is mounted a rivet 18 with a head portion which supports a valve disc 20 in the position shown in FIG. 3. This valve disc 20 is provided with a pair of small orifices 21 and 22 which are respectively aligned with the apertures 16 and 17. The valve disc 20 is movable in a vertical direction relative to the piston 15 and is guided for this movement by the rivet 18.

The operation of the retractor device described is as follows:

Up to the time of usage the belt 7 is wound almost entirely on the belt roller 5. In this position, the belt 7 maintains the bar-shaped latch 11 in an elevated position by means of the belt convolutions on the belt roller 5 so that this latch 11 does not engage the ratchet wheels 8 and 9. The projecting portions 12 and 13 and the piston 15 are likewise in an elevated position as shown in FIG. 4. If proceeding from this initial position, the belt is intended to be used and therefore withdrawn from the belt roller 5 the bar-shaped latch 11 does not remain continuously engaged with the belt convolutions wound on the belt roller 5 which are progressively unwound so that the diameter of the roll of belt steadily decreases. Because of its magnetic flux coupling with the piston 15 the latch 11 is impeded in performing this steady downward movement as the diameter of the belt convolutions decreases. The piston 15 inside the cylinder 14 moves slowly downwardly in the direction indicated by the arrow 24 in FIG. 4 since during downward movement of the piston 15 the valve plate 20 substantially obstructs the apertures 16 and 17 by engagement of the valve plate 20 with the lower surface of the piston. Only a limited rate of fluid may pass from the lower part of the cylinder 14 into the upper part of the cylinder, and this rate of flow is determined by the small diameters of the two orifices 21 and 22. During this slow downward movement of the piston 15, the magnetic flux coupling of the piston 15 with the projecting portions 12 and 13 assures a similar slow downward movement of the bar-shaped latch 11 so that this latch comes after about 5 to about 20 seconds into a lower position similar to the one shown in FIG. 2 in which the latch 11 engages the ratchet wheels 8 and 9 and blocks the belt roller 5 against further withdrawal of the belt 7. When at a later time the belt 7 is no longer intended to be used, the belt roller 5 rewinds the belt 7 through the action of the spring 6 disposed in the retractor device. This rewind operation is not delayed by the latching mechanism 11 since the partly wound belt lifts the bar-shaped latch from below and the piston 15 does not offer any substantial resistance to this movement since the valve disc 20 has in the meantime dropped from the lower surface of the piston 15 downwardly onto the head of the rivet 18 thus freeing the relatively large apertures 16 and 17 so that the fluid may pass substantially freely without needing to overcome any restriction from the chamber defined above the piston 15 into the lower part of the cylinder 14. Simultaneously the latching member 11 moves upwardly in the direction of the arrow 25 in FIG. 3 into its initial position, due to the magnetic flux coupling between piston 15 and portions 12 and 13 of the bar-shaped latch member 11.

Other modifications and variations of the invention, as hereinbefore set forth, may be made without departing from the spirit and scope thereof, and therefore only such limitations should be imposed as are indicated in the appended claims.

I claim:

1. A retractor device for a safety belt, comprising: a casing; a belt roller rotatably mounted in said casing, said belt roller being adapted to wind and unwind said safety belt thereon; a biasing means for said belt roller, biasing the rotation of said belt roller in the direction to wind said safety belt on said belt roller; at least one ratchet wheel being rigidly mounted on said belt roller, said ratchet wheel and said belt roller having a blocked position preventing further withdrawal of said safety belt from said belt roller and an unblocked position allowing further withdrawal of said safety belt from said belt roller; a latching means adapted to engage said ratchet wheel to block said belt roller against further withdrawal of said safety belt therefrom; a restraint means mounted in said casing, said restraint means being adapted to delay engagement of said latching means with said ratchet wheel; and a magnetic coupling between said restraint means and said latching means.

2. A retractor device for a safety belt according to claim 1 wherein said restraint means comprises: a cylinder and a piston disposed within said cylinder, said piston being adapted to move said latching means relative to said ratchet wheel on said belt roller.

3. A retractor device for a safety belt according to claim 2 wherein said magnetic coupling is between said piston and said latching means.

4. A retractor device for a safety belt according to claim 2 wherein said piston comprises a permanent magnet, said cylinder is completely sealed on all sides and made of a non-metallic material, and said latching means comprises a magnetizable metal having portions adjacent to said cylinder.

5. A retractor device for a safety belt according to claim 2 wherein said cylinder is entirely filled with a fluid.

6. A retractor device for a safety belt according to claim 5 wherein said piston is provided with apertures through which pass said fluid contained in said cylinder and said retractor device further comprises a sealing means, said apertures being adapted to be obstructed by said sealing means, obstructing said apertures when said piston moves in a direction which moves said latching means toward said blocked position.

7. A retractor device for a safety belt according to claim 6 wherein said sealing means comprises: a rivet mounted on said piston and a valve disc movably mounted on said rivet.

8. A retractor device for a safety belt according to claim 7 wherein said valve disc is provided wth orifices substantially in alignment with said apertures in said piston.

9. A retractor device for a safety belt according to claim 2 wherein said cylinder is mounted in an upright position above said belt roller, and said latching means is disposed between said cylinder and said belt roller.

10. A retractor device for a safety belt according to claim 1 wherein said latching means comprises a bar-shaped latch having vertically projecting portions adjacent to the outer surface of said cylinder.

11. A retractor device for a safety belt according to claim 1 wherein said casing comprises a bottom plate and a pair of lateral walls, said lateral walls each having a channel means to guide said latching means into engagement with said ratchet wheel and prevent rotation of said latching means and said ratchet wheel after engagement.

* * * * *